US009075880B2

(12) United States Patent
Tsuda et al.

(10) Patent No.: US 9,075,880 B2
(45) Date of Patent: Jul. 7, 2015

(54) METHOD OF ASSOCIATING MULTIPLE APPLICATIONS

(75) Inventors: Munetaka Tsuda, Kyoto (JP); Ryoma Aoki, Kyoto (JP); Yasuto Kakimoto, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 79 days.

(21) Appl. No.: 13/606,720

(22) Filed: Sep. 7, 2012

(65) Prior Publication Data
US 2013/0326540 A1  Dec. 5, 2013

(30) Foreign Application Priority Data
May 31, 2012 (JP) ................................. 2012-124549

(51) Int. Cl.
*G06F 17/30* (2006.01)

(52) U.S. Cl.
CPC ............................... *G06F 17/30864* (2013.01)

(58) Field of Classification Search
None
See application file for complete search history.

(56) References Cited

U.S. PATENT DOCUMENTS

| 8,271,334 | B1 * | 9/2012 | Funk et al. ................. 705/14.73 |
| 2006/0221184 | A1 * | 10/2006 | Vallone et al. ................ 348/155 |
| 2010/0010987 | A1 | 1/2010 | Smyth et al. |
| 2011/0231265 | A1 * | 9/2011 | Brown et al. .............. 705/14.73 |
| 2011/0256907 | A1 * | 10/2011 | Lee et al. ........................ 455/566 |
| 2012/0060114 | A1 * | 3/2012 | Chung et al. .................. 715/800 |
| 2012/0214505 | A1 | 8/2012 | Kaido et al. |
| 2013/0007643 | A1 * | 1/2013 | Edwards et al. ............. 715/763 |
| 2013/0017870 | A1 * | 1/2013 | Parker et al. ...................... 463/1 |

FOREIGN PATENT DOCUMENTS

JP   2010-055177   3/2010

OTHER PUBLICATIONS

Office Action for U.S. Appl. No. 13/606,657, mailed Dec. 5, 2014 (17 pages).
Office Action for U.S. Appl. No. 13/606,657, mailed Jul. 2, 2014 (17 pages).

* cited by examiner

*Primary Examiner* — Tuan Dao
(74) *Attorney, Agent, or Firm* — Nixon & Vanderhye P.C.

(57) ABSTRACT

An exemplary information-processing device includes: a display controller configured, when a second application program, capable of performing a search is activated during execution of a first application program, to display a second image displayed as a result of execution of the activated second application program, and a first image that has been displayed as a result of execution of the first application program before activation of the second application program; and an execution controller configured to notify the second application program of an event corresponding to an input operation, to execute a process according to a procedure described in the second application program, while maintaining the first image to be displayed.

12 Claims, 7 Drawing Sheets

METHOD OF ASSOCIATING MULTIPLE APPLICATIONS

CROSS-REFERENCE TO RELATED APPLICATIONS

This application is based on and claims priority under 35 U.S.C. 119 from Japanese Patent Application No. 2012-424549, which was filed on May 31, 2012.

FIELD

The technology relates to executing multiple application programs.

BACKGROUND AND SUMMARY

A so-called multitask function is known in which, when one application program, is executed, another application program may be additionally activated.

An exemplary embodiment provides an information-processing device including: a display controller configured, when a second application program capable of performing a search is activated during execution of a first application program, to display a second image displayed as a result of execution of the activated second application program and a first image that has been displayed as a result of execution of the first application program before activation of the second application program; and an execution controller configured to notify the second application program of an event corresponding to an input operation, to execute a process according to a procedure described in the second application program, while maintaining the first image to be displayed.

BRIEF DESCRIPTION OF THE DRAWINGS

Exemplary embodiments will now be described with reference to the following drawings, wherein.

DETAILED DESCRIPTION OF NON-LIMITING EXAMPLE EMBODIMENTS

Figure 1:
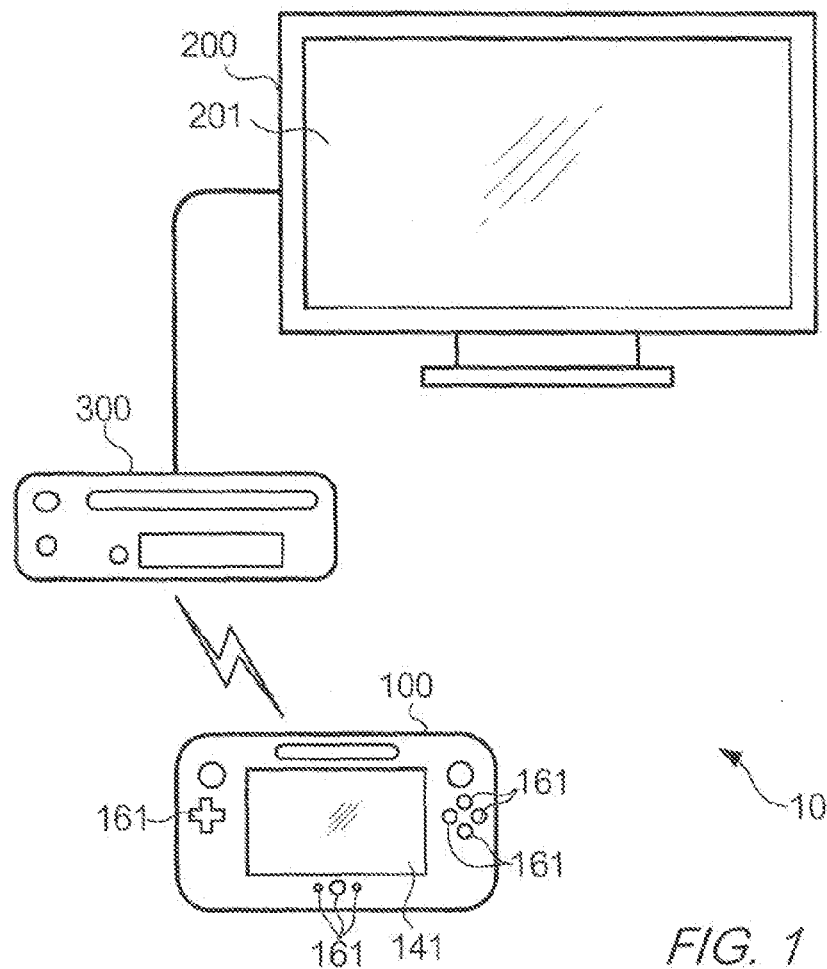
FIG. 1 shows an exemplary non-limiting diagram showing a configuration of a display system.

FIG. 1 is a diagram showing a configuration of display system 10, which is an exemplary embodiment. Display system 10 is a system for displaying a variety of images in accordance with operations performed by a user. Display system 10 includes controller 100, monitor 200, and main device 300. Each of controller 100 and monitor 200 functions as a display device for displaying an image; specifically, controller 100 functions as a first display device and monitor 200 functions as a second display device.

Controller 100 is a hand-held display device, and also is an operation terminal with which a user performs a variety of operations. Controller 100 is provided with an operation means such as buttons 161, in addition to display region 141. Controller 100 causes a variety of images to be displayed in display region 141 based on data transmitted from main device 300, and generates operation information indicating an operation state of buttons 161, and transmits the generated operation information to main device 300.

Monitor 200 is a stationary-type display device, and may be, for example, a television set for receiving a television broadcast or a display of a personal computer. It is assumed that monitor 200 has display region 201 having a larger size than display region 141 of controller 100, though display region 201 may be the same size as or smaller than display region 141 of controller 100.

Main device 300 is configured as a computer for executing programs, and serves as an information-processing device for controlling operation of controller 100 and monitor 200. Main device 300 is connected to each of controller 100 and monitor 200 via wired or wireless communication. It is assumed here that main device 300 conducts wireless communication with controller 100 and conducts wired communication with monitor 200. Main device 300 has a multitask function capable of executing multiple application programs in parallel. Owing to this multitask function, main device 300 executes in parallel, for example, a game program for presenting a game to a user and a browser program for allowing a user to browse web pages.

Main device 300 causes at least one of controller 100 and monitor 200 to display an image. Depending on a user operation and/or a type of an image to be displayed, main device 300 may cause only one of controller 100 and monitor 200 to display an image or may cause each of controller 100 and monitor 200 to display an image. It is to be noted that, in a case where an image is displayed on each of controller 100 and monitor 200, main device 300 may cause the same image to be displayed on controller 100 and monitor 200, or may cause different images to be displayed on controller 100 and monitor 200.

While a user is playing a game using this display system 10, if the user wishes to know an effective way to complete the game, for example, the user may operate controller 100 to activate a browser program of main device 300. At this time, main device 300 causes monitor 200 to display a captured image (so-called "screen shot") which was displayed on controller 100 and monitor 200 during playing of the game immediately before activation of the browser program, and causes controller 100 to display an image of the newly activated browser program. Further, main device 300 presents information relating to the game program (hereinafter referred to as application-related information), such as the title of the game being played, to the user as a candidate for a keyword serving as an item to be searched for (hereinafter, referred to as a search item), together with the image of the browser program displayed on controller 100. This presentation may be achieved in any way such as display of an image representing the application-related information or output of sound representing the application-related information, so long as the information is conveyed to the user. However, in this exemplary embodiment, explanation will be given taking display of an image as an example. When a user instructs a search to the browser program with the presented application information being a search item, a search engine on the Internet or the like operates in response to a request from the browser program, and main device 300 can obtain a result of the search performed by the search engine.

Figure 2:
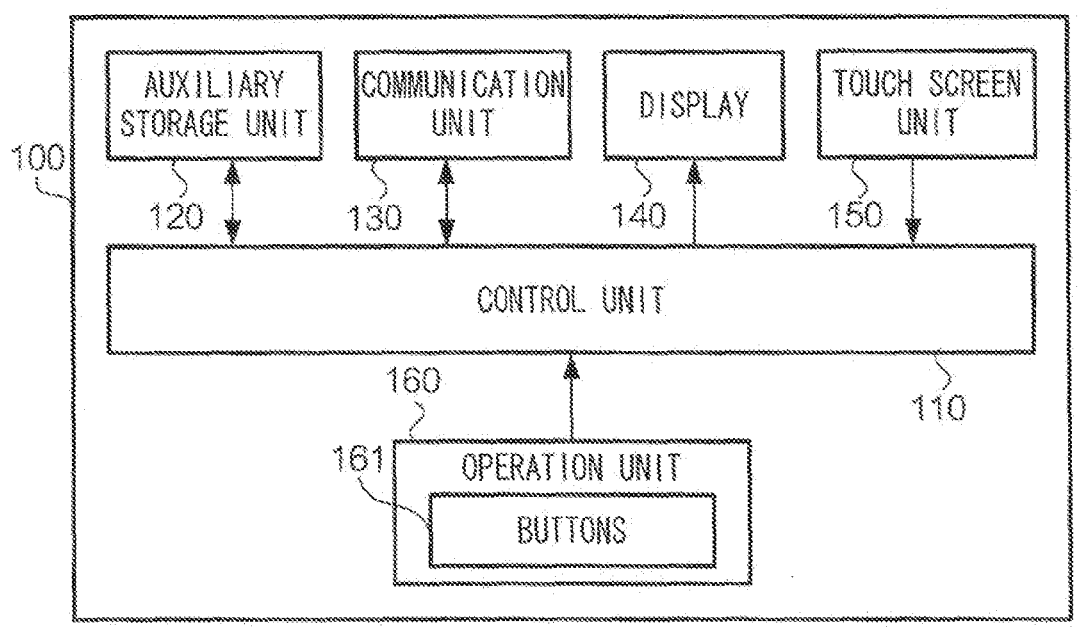
FIG. 2 shows an exemplary non-limiting block diagram showing a hardware configuration of the controller.

FIG. 2 is a block diagram showing a hardware configuration of controller 100. Controller 100 includes control unit 110, auxiliary storage unit 120, communication unit 130, display 140, touch screen unit 150, and operation unit 160.

Control unit 110 is a means for controlling operations of various units of controller 100. Control unit 110 includes a processing device such as a CPU (Central Processing Unit), a memory serving as a main memory device, an input/output interface for communicating information with various units of controller 100, and so on, and executes a program(s) to control display of images or data transmission and reception to and from main device 300.

Auxiliary storage unit 120 is a means for storing data used by control unit 110. Auxiliary storage unit 120 is a flash memory, for example. It is to be noted that auxiliary storage unit 120 may include a detachable storage medium such as a so-called memory card.

Communication unit 130 is a means for communicating with main device 300. Communication unit 130 includes an antenna or the like for communicating with main device 300 wirelessly.

Display 140 is a means for displaying an image. Display 140 includes a display panel having pixels formed by liquid crystal elements or organic EL (electroluminescence) elements, and a drive circuit for driving the display panel and displays, in display region 141 an image in accordance with image data provided from control unit 110.

Touch screen unit 150 is a means for receiving an operation performed by a user, and generating coordinate information that represents a position in display region 141, to supply the coordinate information to control unit 110. Touch screen unit 150 includes a sensor disposed to overlap display region 141, and a control circuit for generating coordinate information representing a position detected by the sensor and providing the coordinate information to control unit 110. Touch screen unit 150 may be of resistive type, or may be of another type such as capacitive type.

Operation unit 160 is another means for receiving an operation performed by a user. Operation unit 160 includes the aforementioned buttons 161, and provides control unit 110 with operation information in accordance with an operation performed by a user.

Figure 3:
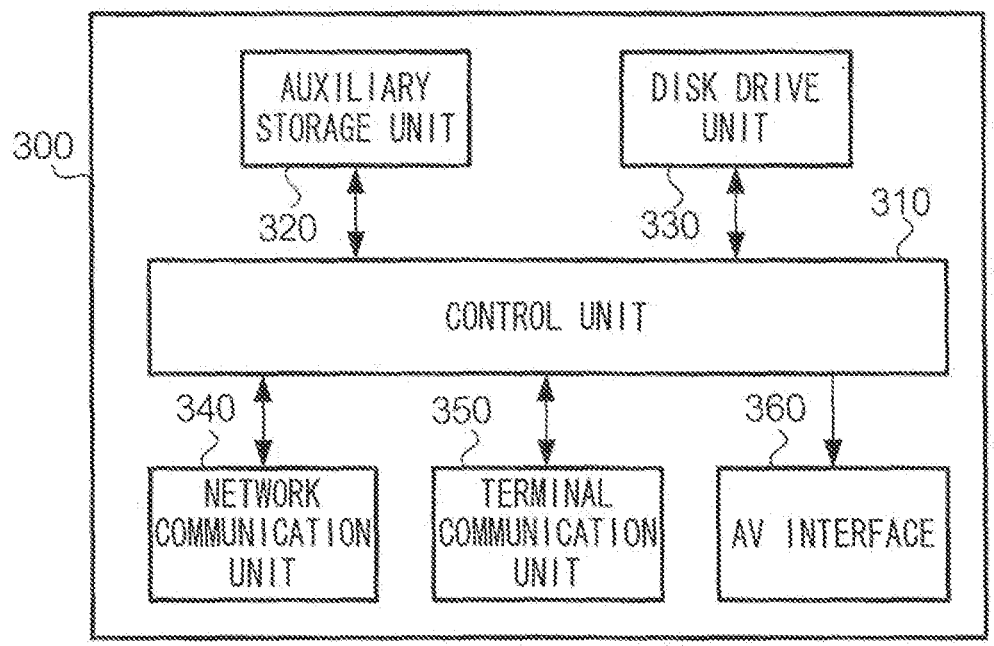
FIG. 3 shows an exemplary non-limiting block diagram showing a hardware configuration of a main device.

FIG. 3 is a block diagram showing a hardware configuration of main device 300. Main device 300 includes control unit 310, auxiliary storage unit 320, disk drive unit 330, network communication unit 340, terminal communication unit 350, and AV (Audio and Visual) interface unit 360.

Control unit 310 is a means for controlling operations of various units of main device 300 by executing a program(s), and corresponds to a "computer" in the exemplary embodiment. Control unit 310 includes a processing device such as a CPU, a GPU (Graphics Processing Unit), a DSP (Digital Signal Processor) or the like, a memory serving as a main memory device or a VRAM (Video Random Access Memory), an input/output interface for communicating information with various units of main device 300, and so on.

Auxiliary storage unit 320 is a means for storing data used by control unit 310. Auxiliary storage unit 320 is a flash memory or a hard disk, for example, but may include a detachable storage medium such as a memory card. Auxiliary storage unit 320 is capable of storing programs to be executed by control unit 310 and data acquired via network communication unit 340 or terminal communication unit 350. The programs stored in auxiliary storage unit 320 include a game program for presenting a game to a user and a browser program for browsing web pages.

Disk drive unit 330 is a means for reading data stored in an optical disk (optical storage medium). The optical disk may store data used for playing a game, such as a game program, for example. It is to be noted that disk drive unit 330 may read data stored in another storage medium such as a magneto-optical disk or a semiconductor memory.

Network communication unit 340 is a means for communicating via a network such as the Internet. The communication performed by network communication unit 340 may be wired or wireless communication. Network communication unit 340 receives data from an external server device or transmits data thereto in accordance with instructions from control unit 310.

Terminal communication unit 350 is a means for communicating with controller 100. In a case where a controller other than controller 100 is used, terminal communication unit 350 may communicate with the other controller. The wireless communication performed by terminal communication unit 350 may utilize any communication technology such as Wi-Fi, Bluetooth, or infrared communication.

AV interface unit 360 is a means tor supplying to monitor 200 image data, sound data, or the like. AV interface unit 360 includes one or more interfaces such as an HDMI (High-Definition Multimedia Interface) terminal or the like.

Figure 4:
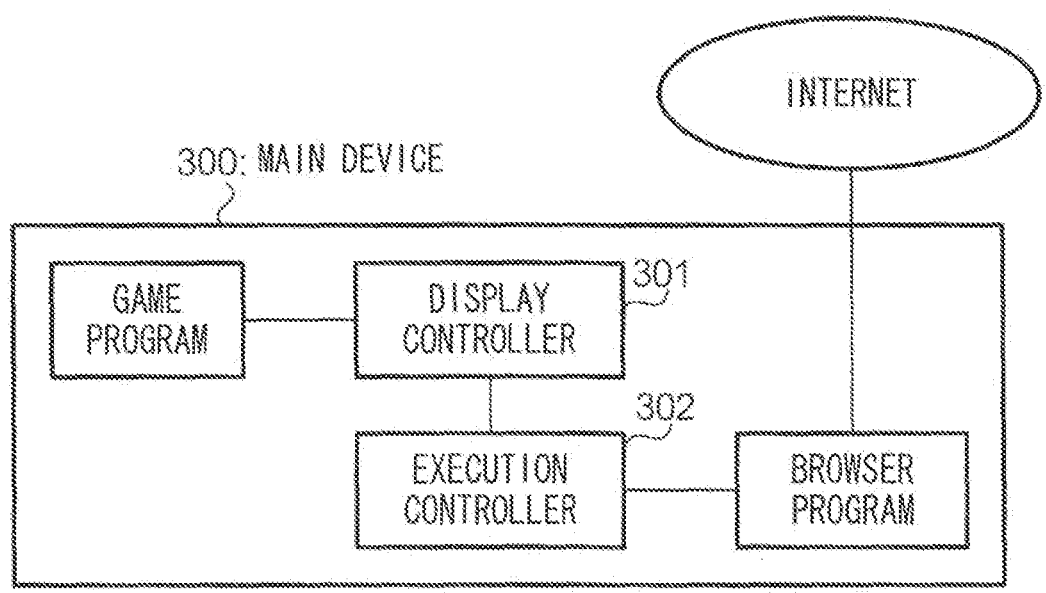
FIG. 4 shows an exemplary non-limiting block diagram showing a principal functional configuration of the main device.

FIG. 4 is a block diagram (functional block diagram) showing a principal functional configuration of main device 300. Main device 300 includes display controller 301 and execution controller 302. The functions of these units are realized by execution of one or more programs by control unit 310 of main device 300. Main device 300 may realize the functions of the units shown in FIG. 4 by executing a single program or multiple programs.

Display controller 301 is a means realized by control unit 310 and terminal communication unit 350, for example, and, when a second application program, in which a search can be performed, is activated during execution of a first application program, causes a second image displayed as a result of execution of the activated second application program and a first image that was displayed as a result of execution of the first application program before activation of the second application program to be displayed. For example, in a case where the first application program is a game program, and the second application program is a browser program, display controller 301 causes an image of the activated browser program and an image that was displayed while the game program was being executed before activation of the browser program to be displayed.

Execution controller 302 notifies to the second application program an event corresponding to an operation performed by a user, to cause a process according to a procedure described in the second application program to be executed, while maintaining an image displayed as a result of execution of the first application program to be displayed. For example, in a case where the first application program is a game program, and the second application program is a browser program, Execution controller 302 notifies the browser program of an event corresponding to an operation performed by a user (for example, instructing a search with a certain string of characters as a search item), to cause the browser program to execute a process (search process) according to the procedure described in the browser program. Another example of an event may be an operation performed by the user alter a search process, such as scrolling or magnification of a displayed image.

Figure 5:
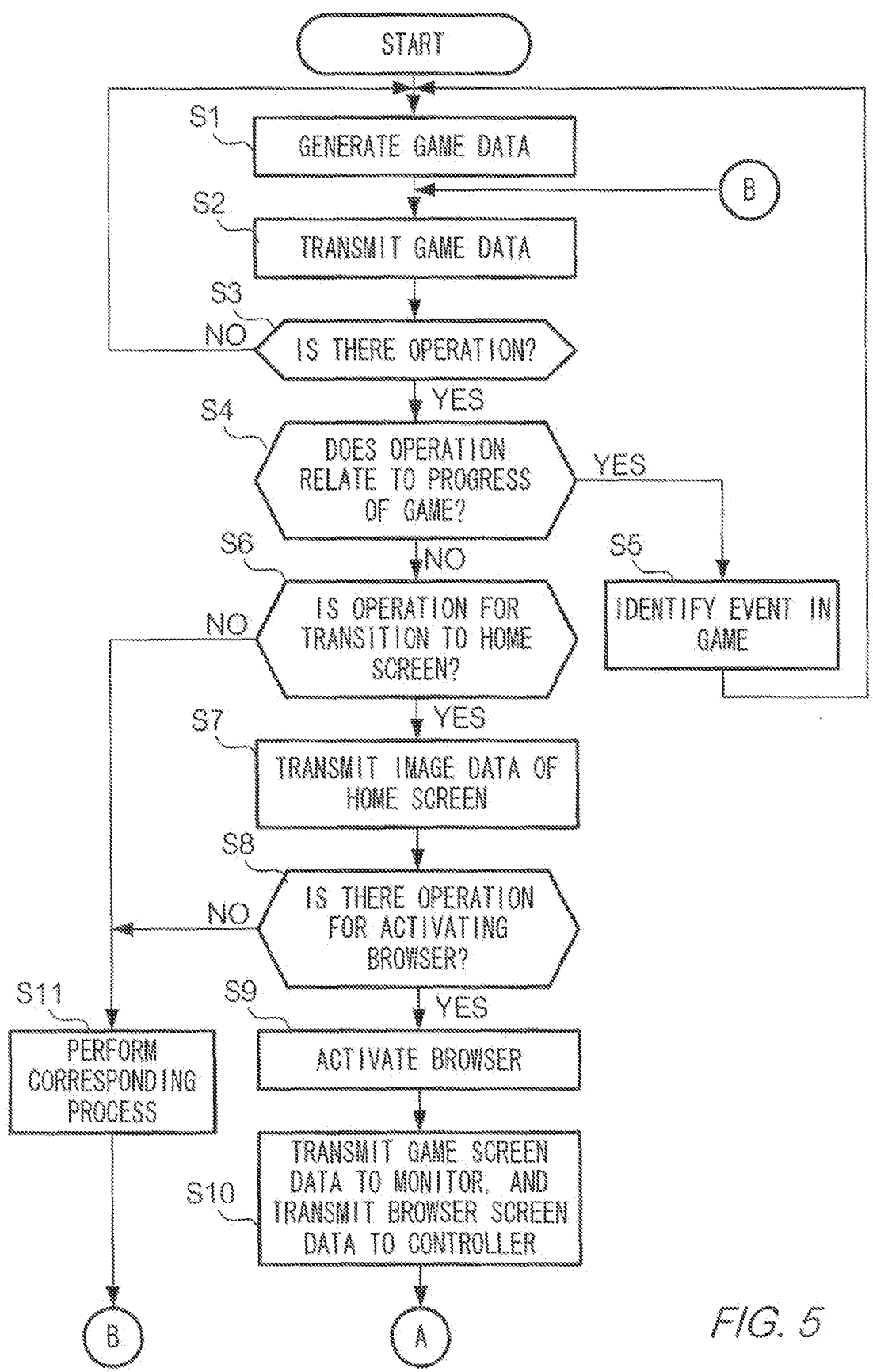
FIG. 5 shows an exemplary non-limiting flowchart showing a process executed by the main device.
Figure 8:
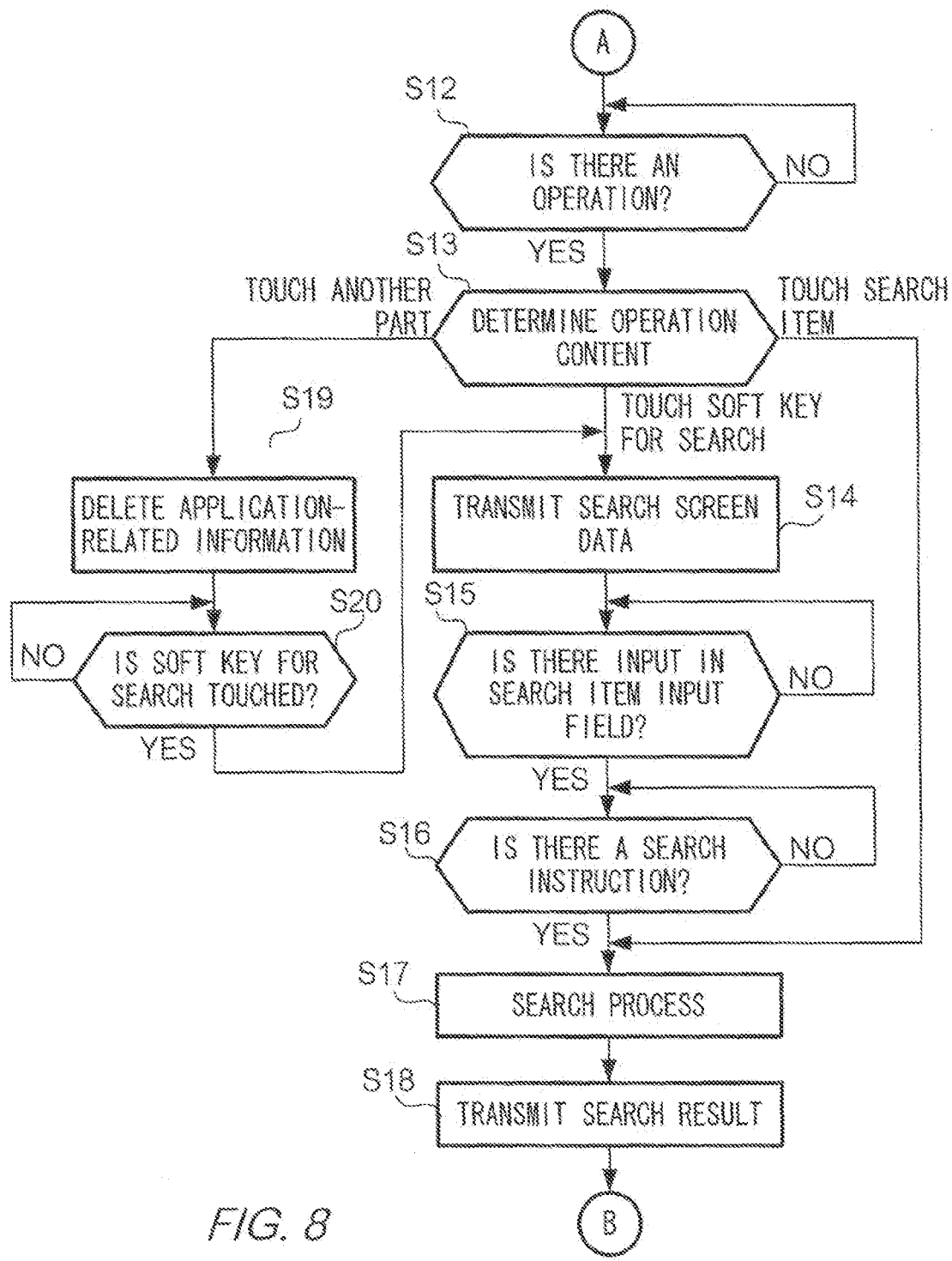
FIG. 8 shows an exemplary non-limiting flowchart showing a process executed by the main device.

Next, explanation will be given of an operation of this exemplary embodiment. FIGS. 5 and 8 are flowcharts showing a process performed by main device 300. Upon activation of a game program, control unit 310 of main device 300 generates game data according to a procedure described in the game program, where the game data includes image data representing game images, sound data representing the sound output while each game image is displayed, and so on (step S1). The game data includes two types of game data: game data for the controller, which is to be output from controller 100; and game data for the monitor, which is to be output from monitor 200, and control unit 310 generates the two types of game data.

Then, control unit 310 transmits the game data for the controller to controller 100 via terminal communication unit 350, and transmits the game data for the monitor to monitor 200 via AV interface unit 360 (step S2). Upon receipt of the game data for the controller, control unit 110 of controller 100 displays, in display region 141, a game image based on the image data, and outputs sound according to the sound data. On the other hand, upon receipt of the game data for the monitor, monitor 200 displays, in display region 201, a game image based on the image data, and outputs sound according to the sound data.

Figure 6:
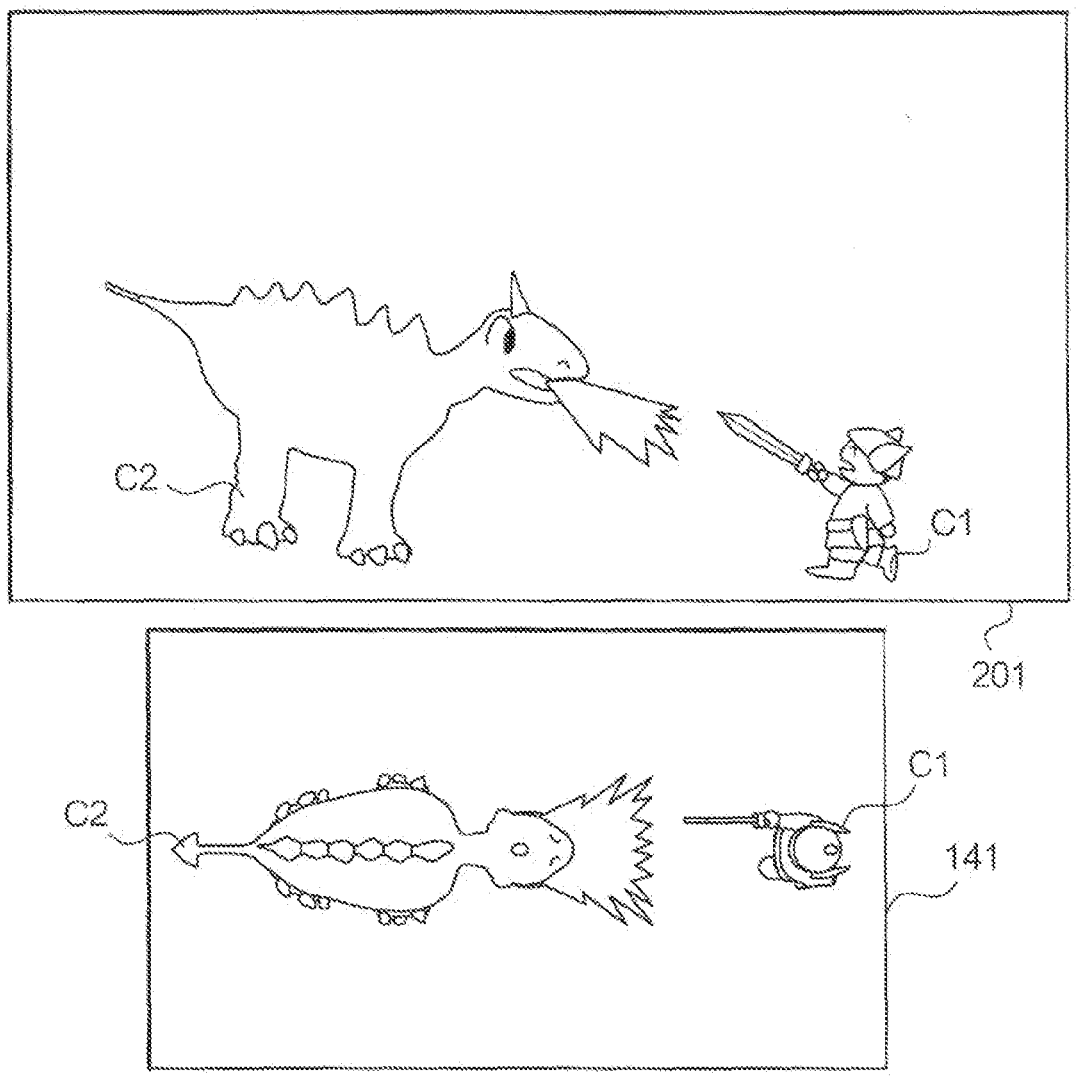
FIG. 6 shows an exemplary non-limiting diagram showing exemplary images displayed on the monitor and the controller.

FIG. 6 is a diagram showing exemplary game images displayed on controller 100 and monitor 200. Displayed in display region 201 of monitor 200 is an image showing character C1, which is a main character in a game, and character C2, which is a monster the main character fights against, viewed from the side in a virtual three-dimensional space. On the other hand, displayed in display region 141 of controller 100 is an image showing characters C1 and C2 viewed from above in the virtual three-dimensional space.

Referring again to FIG. 5, if a user performs an operation with controller 100 during the progress of the game (step S3; YES), control unit 110 of controller 100 generates operation information representing the operation and transmit the operation information to main device 300. Control unit 310 of main device 300 acquires the operation information from controller 100. Control unit 310 determines whether the operation represented by the operation information is an operation relating to the progress of the game (step S4). If the operation is an operation relating to the progress of the game (step S4; YES), control unit 310 identifies an event corresponding to the operation in the progress of the game (step S5), and generates game data, by applying the event to the procedure described in the game program (step S1). While the game is in progress, the process from step S1 to step S5 is repeated.

If it is determined in step S4 that the operation performed by the user is not an operation relating to the progress of the game (step S4; NO), control unit 310 determines whether the operation represented by the operation information is an operation instructing return to a home screen (step S6). A home screen here is an image displayed first to guide various functions provided by main device 300. If the operation is an operation for returning to the home screen (step S6; YES), control unit 310 temporarily suspends execution of the game program, reads out image data of home screen from auxiliary storage unit 320, and transmits the image data of home screen to controller 100 via terminal communication unit 350 and to monitor 200 via AV interface unit 360 (step S7). Upon receipt of the image data of home screen, each of control unit 110 of controller 100 and monitor 200 displays the home screen based on the image data of home screen.

Arranged in this home screen are, in addition to a soft key for activating a browser program, a soft key for viewing television, a soft key for calling a so-called help function, and a soft key for calling other various menus, for example.

When an operation for activating a browser program is performed in the home screen (step S8; YES), control unit 310 suspends the progress of the game caused by execution of the game program, and activates the browser program (step S9). Then, control unit 310 transmits to monitor 200 game image data, which is image data for the game displayed on each of monitor 200 and controller 100 immediately before transition to the home screen (namely, immediately before temporal suspension of execution of the game program), and transmits to controller 100 browser image data representing an image of the browser program (step S10).

At this time, control unit 310 reads out the title of the game stored in association with the game program (for example, "ADVENTURES OF PRINCE") from auxiliary storage unit 320, and transmits the title of the game to controller 100 as a part of the browser image data. Upon receipt of the game image data, monitor 200 displays a game image based on the game image data. On the other hand, upon receipt of the browser image data, control unit 110 of controller 100 displays a browser image based on the browser image data. It is to be noted that, if the determination in steps S6 and step S8 is "NO," control unit 310 of main device 300 performs a predetermined corresponding process (step S11). For example, if an operation instructing return to the game is performed, control unit 310 of main device 300 restarts execution of the game program from the suspended point in the procedure. Namely, in accordance with the procedure described in the game program, control unit 310 generates game data for controller and game data for monitor, and transmits them to controller 100 and monitor 200, respectively. As is described in the foregoing, control unit 310 serves as a return unit for restarting progress of a game caused by execution of a game program (i.e., progress of a service of a game based on a game program) from a point at which the progress was suspended.

Figure 7:
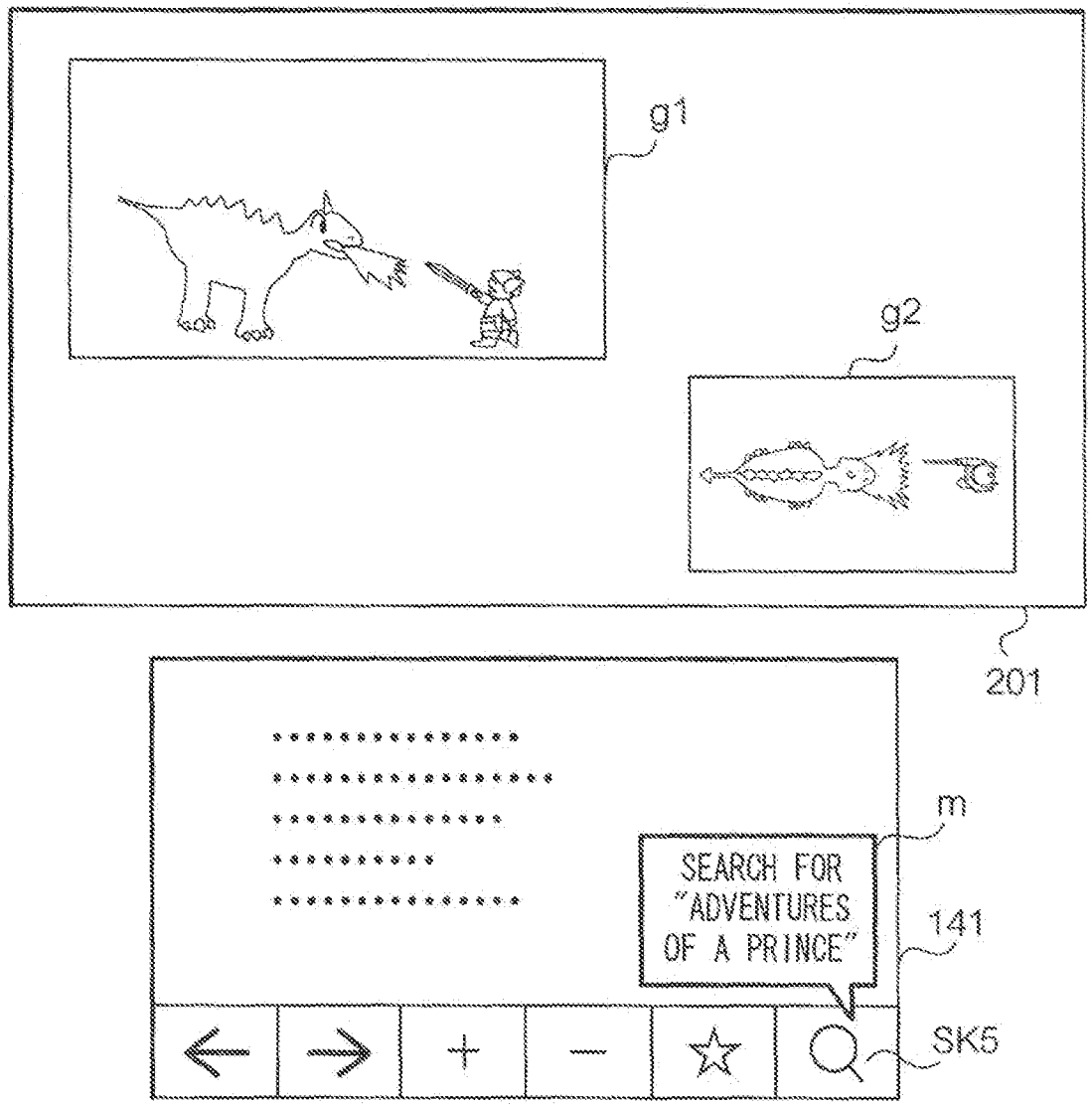
FIG. 7 shows an exemplary non-limiting diagram showing exemplary images displayed on the monitor and the controller.

FIG. 7 is a diagram showing exemplary images displayed on controller 100 and monitor 200 when a browser program has been activated. Displayed in display region 201 of monitor 200 are game image g1, which was displayed in display region 201 of monitor 200 immediately before transition to the home screen, and game image g2, which was displayed in region 141 of controller 100 immediately before transition to the home screen. On the other hand, displayed in display region 141 is a browser image. In this browser image, message m 'SEARCH FOR "ADVENTURES OF PRINCE" is displayed in connection with son key SK5 for transition to a search image, as a form of a so-called balloon superimposed on the browser image. A user recognizes this string of characters "ADVENTURES OF PRINCE" as a candidate for a search item. As is described in the foregoing, when a browser program is activated, in place of an image displayed as a result of execution of a game program, an image displayed as a result of execution of the browser program and message m including application-related information such as 'SEARCH FOR "ADVENTURES OF PRINCE" are displayed in display region 141 of controller 100.

Next, with reference to FIG. 8, if the user performs an operation with controller 100 (step S12; YES), control unit 310 acquires operation information from controller 100, and determines an operation content (event) of the operation information (step S13). If the operation content (event) is touching of message m displayed as a form of a balloon (step S13; touch search item), control unit 310 determines that an operation instructing a search for the string of characters "ADVENTURES OF PRINCE" included in message m is performed, and performs a search with "ADVENTURES OF PRINCE" being a search item (step S17). Namely, in this process, control unit 310 notifies to the browser program an event corresponding to an operation performed by a user, to perform a process for searching in accordance with a procedure described in the browser program, while maintaining an image displayed as a result of execution of a game program to be displayed on monitor 200.

Subsequently, when a result of the search is obtained, control unit 310 transmits to controller 100 search result image data representing the search result (step S18). Upon receipt of the search result image data, control unit 110 of controller 100 displays a search result image based on the search result image data. Thus, even when an image for inputting a search item is not displayed as a result of activation of a browser program, the browser program is given an instruction to search for information relating to the string of characters "ADVENTURES OF PRINCE" included in message m.

Figure 9:
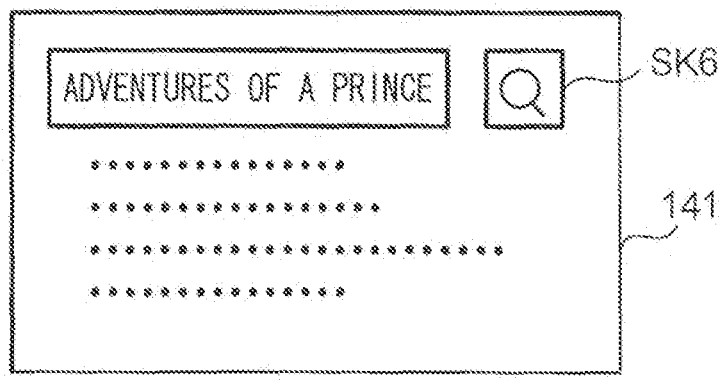
FIG. 9 shows an exemplary non-limiting diagram showing an exemplary image displayed on the controller.

FIG. 9 is a diagram showing an exemplary search result image displayed on controller 100. In a search result image displayed in display region 141 of controller 100, below the string of characters "ADVENTURES OF PRINCE," which is the search item, a result of the search for information on the Internet relating to the string of characters is displayed. A user can select a desired one from the search result to browse the information in detail.

Referring again to FIG. 8, in step S13, if the operation content (event) is touching of soft key SK5 for transition to a search image (step S13; touch soft key for search), control unit 310 transmits to controller 100 search image data representing a search image (step S14). At this time, control unit 310 reads out from auxiliary storage unit 320 the title of the game "ADVENTURES OF PRINCE" stored in association with the game program, and transmits the title of the game to controller 100 as a part of the search image data. Upon receipt of the search image data, control unit 110 of controller 100 displays a search image based on the search image data.

Figure 10:
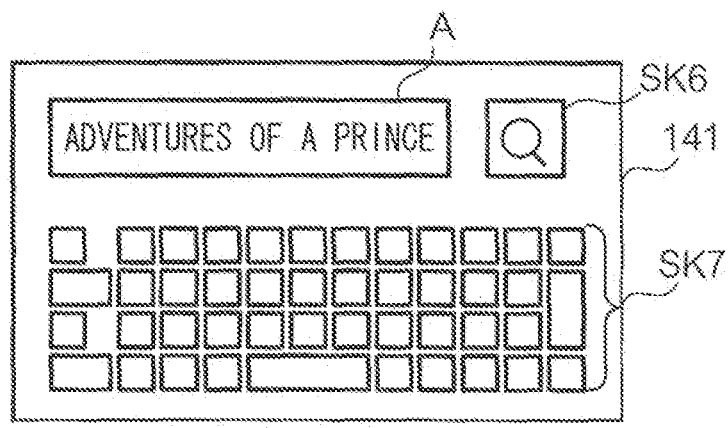
FIG. 10 shows an exemplary non-limiting diagram showing an exemplary image displayed on the controller.

FIG. 10 is a diagram showing an exemplary search image displayed on controller 100. In a search image displayed in display region 141 of controller 100, "ADVENTURES OF PRINCE" is inputted automatically (i.e., without need for an input operation performed by a user) and displayed in input field A for inputting a search item. Below input field A is displayed soft keys SK7 resembling a keyboard. As is described in the foregoing, when message m including the string of characters "ADVENTURES OF PRINCE" shown in FIG. 7 is selected (step S13; touch search item), a search for the string of characters "ADVENTURES OF PRINCE" is performed immediately, and, on the other hand, when soft key SK5, which is an operation element indicating search, is selected (step 113; touch soft key for search), the screen image is caused to transition to a search image in which the presented string of characters "ADVENTURES OF PRINCE" has been input as an initial value.

By using soft keys SK7, the user can input desired characters into the input field in addition to the string of characters "ADVENTURES OF PRINCE." For example, if the user wishes to know options for attacking the monster displayed on monitor 200, the user may input one or more strings of characters such as "dinosaur," "monster exhaling fire," or "attack," in addition to the string of characters "ADVENTURES OF PRINCE." At this time, the game image shown on monitor 200 (FIG. 7) may be viewed as reference or assisting information when the user inputs a keyword(s) serving as a search item(s). Thus, the game image displayed on monitor 200 facilitates a search for information relating to the application program.

Referring again to FIG. 8, since the string of characters "ADVENTURES OF PRINCE" has been input automatically in the input field for inputting a search item, as described with reference to FIG. 10 (step S15; YES), upon touching by the user of soft key SK6 for instructing search, control unit 310 receives operation information corresponding thereto (step S16), and performs a search in accordance with the search instruction (step S17). When a result of the search is obtained, control unit 310 transmits to controller 100 search result image data representing the search result (step S18). Upon receipt of the search result image data, control unit 110 of controller 100 displays a search result image based on the search result image data (refer to FIG. 9). Thus, irrespective of whether a search image for inputting a search item is displayed as a result of activation of a browser program, it is possible to instruct the browser program to search for information relating to the string of characters "ADVENTURES OF PRINCE."

Further, in a case where it is determined in step S13 that the operation content (event) is touching by the user of an area other than soft key SK5 and message m (step S13; touch another part), control unit 310 transmits browser image data to controller 100. Upon receipt of the browser image data, control unit 110 of controller 100 displays a browser image based on the image data (step S19).

Figure 11:
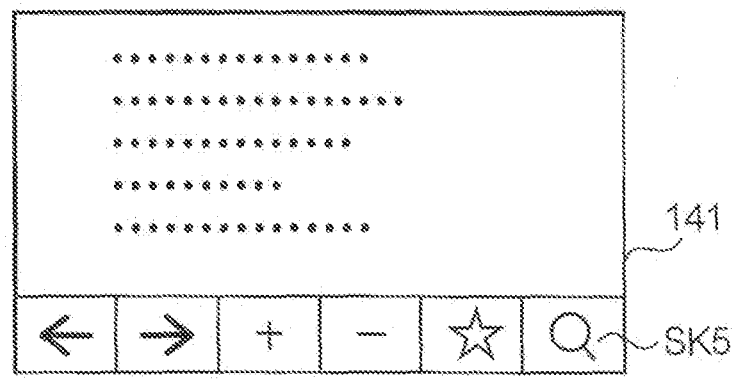
FIG. 11 shows an exemplary non-limiting diagram showing an exemplary image displayed on the controller.

FIG. 11 is a diagram showing an exemplary browser image displayed on controller 100. In a state where a browser image is displayed on controller 100, message m 'SEARCH FOR "ADVENTURES OF PRINCE" is not displayed in connection with soft key SK5 for transition to a search image. Namely, when compared to FIG. 7, the browser image is displayed with message m being deleted. In this image, when soft key SK5 for transition to a search image (step S20; YES), control unit 310 transmits to controller 100 search image data representing a search image (step S14). At this time, control unit 310 reads out from auxiliary storage unit 320 the title of the game "ADVENTURES OF PRINCE" stored m association with the game program, and transmits the title of the game to controller 100 as a part of the search image data. As a result of this, the image identical with that shown in FIG. 10 is displayed on controller 100. Namely, deleted message m is presented again as a search item. By using soft keys SK7, the user can input desired characters into the input field in addition to the string of characters "ADVENTURES OF PRINCE."

Modifications

The exemplary embodiment described in the foregoing can be carried out in other embodiments, as shown by the following modifications. It is to be noted that multiple modifications may be combined in carrying out the exemplary embodiment.

Modification 1

In the exemplary embodiment, a game program is described as an example of a first application program, and a browser program is described as an example of a second application program. However, the first application program and the second application program are not limited to the examples described in the exemplary embodiment. The first application program may be any program, and the second application program may be any program so long as a search can be performed. An example of the second application program may be an application program, such as a dictionary software, which pre-stores information and performs for information desired by a user. Namely the search process performed by the second application program may be a search process performed via the Internet, or may be a search process performed by accessing a storage device without accessing the Internet.

Modification 2

Display device 10 may be used without use of monitor 200. Though an image is displayed on each of controller 100 and monitor 200 in the exemplary embodiment, it is possible to display an linage only on controller 100 or only on monitor 200. In this case, control unit 310 of main device 300 causes a game image of a first application program (e.g., game program) to be displayed on either controller 100 or monitor 200, and, when a second application (e.g., browser program) is activated, causes a browser program to be displayed in place of the game image. Further, control unit 310 of main device 300 may display an image displayed by execution of a first application program (e.g., game program) and an image of a second application program (e.g., browser program), in which a search can be performed, simultaneously on a single display device, by dividing the display region of the display device into multiple parts, for example.

Modification 3

In the exemplary embodiment, application-related information relating to a first application program is stored in association with a type of the first application program. The stored application-related information is not limited to the title of a game, and may be any information so long as it relates to the first application program.

Further, it is also possible to store application-related information relating to the first application program in association with a state of execution of the first application program when the first application program is executed. A state of execution here indicates a varying procedure executed in the program. For example, in a case where the first application program is a game program, it is possible that, for each image displayed in the game, a string of characters representing the content of the image be stored as the application-related information. Further, for each scene in the game, a string of characters representing the scene may be stored as the application-related information. At this time, in a case where the game presented by the first application program is a game in a three-dimensional space, for example, the position of the point of view and the viewing direction when viewing the three-dimensional space may vary in accordance with an operation performed by a user, and this may result in varying game images displayed for the same scene in the game. Therefore, in this case, it can be said that the application-related information is stored for each scene of the game, rather than that the application-related information is stored for each image displayed in the game.

Modification 4

In the foregoing exemplary embodiment, when a browser program is activated while the user is playing a game using display system 10, control unit 301 of main device 300 causes monitor 200 to display a captured image (so-called "screen shot") which was displayed on controller 100 and monitor 200 during playing of the game immediately before activation of the browser program.

The image displayed on monitor 200 at this time is not limited to the image which was displayed on controller 100 and monitor 200 immediately before activation of the browser program (second application program). For example, in a case where multiple game scenes are provided by execution of the game program (first application program), it may be considered to set a single image for each game scene for screen shot. In this case, control unit 301 may cause the image set for the game scene at the time the browser program (second application program) is activated to be displayed.

Further, the image displayed on monitor 200 at this time is not limited to a stationary image as a screen shot, and may be a moving image. For example, control unit 301 may cause a moving image displayed on controller 100 or monitor 200 in accordance with execution of a game program (first application program) during a predetermined period before activation of a browser program (second application program) to be displayed on monitor 200.

Modification 5

The exemplary embodiment does not have to be carried out in a main device 300, in a display system including main device 300 and controller 100, or in a display system (display system 10) further including monitor 200, but also can be carried out in an information-processing device including integrally a configuration corresponding to main device 300 and a configuration corresponding to controller 100. Further, the functions of the main device may be assigned to and realized by multiple devices.

Further, the exemplary embodiment may be carried out not only as an information-processing device or a display system as described in the foregoing, but also as an information-processing method or a program for executing such a method. Furthermore, the program of the exemplary embodiment may be stored in a storage medium such as an optical disk or a semiconductor memory, or may be downloaded to an information-processing device via a network such as the Internet.

The foregoing description of the embodiments is provided for purposes of illustration and description, and is in no way to be taken as either exhaustive or specifically limitative of the exemplary embodiment; and it will be obvious to those skilled in the art that a wide range of modifications and variations can be applied to the exemplified embodiments, with such embodiments having been chosen merely with a view to providing a clear explanation of the principles of the exemplary embodiment and its range of practical application, thereby to enable others skilled in the art to understand the exemplary embodiment in the context of a variety of embodiments, which can be adopted in the scope of the exemplary embodiment so as to best suit a contemplated use. The scope of the exemplary embodiment is intended to be defined by the claims that follow and equivalents thereof.

What is claimed is:

1. An information-processing device comprising one or more processing resources including at least one processor and a memory, the information-processing device comprising:
   a display controller, under control of the processing resource(s), configured, when a second application program capable of performing a search is activated during execution of a first application program, to display a second image displayed as a result of execution of the activated second application program and a first image that has been displayed as a result of execution of the first application program before activation of the second application program;
   an execution controller, under control of the processing resource(s), configured to notify the second application program of an event corresponding to an input operation, to execute a process according to a procedure described in the second application program, while maintaining the first image to be displayed; and the display controller, under control of the processing resource(s), is further configured:
- when the first application program is executed, to cause each of a first display and a second display to display an image; and
- when the second application program capable of performing a search is activated after the image is displayed on each of the first display and the second display, to display the second image on the first display, and to display images that have been displayed on the first display and the second display respectively as a result of execution of the first application program before activation of the second application program on the second display.

2. The information-processing device according to claim 1, wherein the first display is a first display screen and the second display is a second display screen that is separately housed from the first display screen.

3. The information-processing device according to claim 1, wherein the first display corresponds to a first region of a display device and the second display corresponds to a second region of the display device that is different from the first region of the display device.

4. An information-processing system comprising:
a first display;
a second display; and
one or more processing resources including at least one processor and a memory, the information-processing system being configured to at least perform:
a display control, under control of the processing resource(s), configured, when a second application program capable of performing a search is activated during execution of a first application program, to display a second image displayed as a result of execution of the activated second application program and a first image that has been displayed as a result of execution of the first application program before activation of the second application program; and
an execution control, under control of the processing resource(s), configured to notify the second application program of an event corresponding to an input operation, to execute a process according to a procedure described in the second application program, while maintaining the first image to be displayed, wherein:
the display control, under control of the processing resource(s), is further configured:
when the first application program is executed, to cause each of the first display and the second display to display an image; and
when the second application program capable of performing a search is activated after the image is displayed on each of the first display and the second display, to display the second image on the first display, and to display images that have been displayed on the first display and the second display respectively as a result of execution of the first application program before activation of the second application program on the second display.

5. The information-processing system according to claim 4, wherein the first display is a first display screen and the second display is a second display screen that is separately housed from the first display screen.

6. The information-processing system according to claim 4, wherein the first display corresponds to a first region of a display device and the second display corresponds to a second region of the display device that is different from the first region of the display device.

7. An information-processing method comprising:
when a second application program capable of performing a search is activated during execution of a first application program by a processing system including a processor, displaying a second image displayed as a result of execution of the activated second application program and a first image that has been displayed as a result of execution of the first application program before activation of the second application program;
notifying the second application program of an event corresponding to an input operation, to execute a process according to a procedure described in the second application program, while maintaining the first image to be displayed;
when the first application program is executed, causing each of a first display and a second display to display an image; and
when the second application program capable of performing a search is activated after the image is displayed on each of the first display and the second display, displaying the second image on the first display, and displaying images that have been displayed on the first display and the second display respectively as a result of execution of the first application program before activation of the second application program on the second display.

8. The information-processing method according to claim 7, wherein the first display is a first display screen and the second display is a second display screen that is separately housed from the first display screen.

9. The information-processing method according to claim 7, wherein the first display corresponds to a first region of a display device and the second display corresponds to a second region of the display device that is different from the first region of the display device.

10. A non-transitory computer-readable storage medium storing a program for, when executed, causing a computer to provide functionality comprising:
when a second application program capable of performing a search is activated during execution of a first application program, displaying a second image displayed as a result of execution of the activated second application program and a first image that has been displayed as a result of execution of the first application program before activation of the second application program;
notifying the second application program of an event corresponding to an input operation, to execute a process according to a procedure described in the second application program, while maintaining the first image to be displayed;
when the first application program is executed, causing each of a first display and a second display to display an image; and
when the second application program capable of performing a search is activated after the image is displayed on each of the first display and the second display, displaying the second image on the first display, and displaying images that have been displayed on the first display and the second display respectively as a result of execution of the first application program before activation of the second application program on the second display.

11. The non-transitory computer-readable storage medium having the program stored therein according to claim 10, wherein the first display is a first display screen and the second display is a second display screen that is separately housed from the first display screen.

12. The non-transitory computer-readable storage medium having the program stored therein according to claim 10, wherein the first display corresponds to a first region of a display device and the second display corresponds to a second region of the display device that is different from the first region of the display device.

* * * * *